United States Patent [19]

Berryman et al.

[11] 4,230,165
[45] Oct. 28, 1980

[54] HYDROSTATIC DRIVE FOR LATHES

[75] Inventors: John E. Berryman; John W. Metzner, both of Vancouver, Canada

[73] Assignee: P.S.I. Fluid Power Ltd., Vancouver, Canada

[21] Appl. No.: 26,324

[22] Filed: Apr. 2, 1979

[51] Int. Cl.³ ............................................. B27L 5/02
[52] U.S. Cl. .................................. 144/209 R; 144/179
[58] Field of Search .................. 144/209 R, 211, 212, 144/213, 214, 215, 178, 179

[56] References Cited

U.S. PATENT DOCUMENTS

| | | | |
|---|---|---|---|
| 2,027,295 | 1/1936 | Stoddard | 144/209 R |
| 2,340,532 | 2/1944 | Jackson | 144/209 R |
| 2,534,671 | 12/1950 | Haumann | 144/209 R |
| 3,040,791 | 6/1962 | Fauchon | 144/209 R |
| 3,244,206 | 4/1966 | Bossen | 144/209 R |
| 3,680,613 | 8/1972 | Daniels et al. | 144/209 R |

FOREIGN PATENT DOCUMENTS 2755097  7/1978  Fed. Rep. of Germany .......... 144/213

*Primary Examiner*—Willie G. Abercrombie
*Attorney, Agent, or Firm*—Christie, Parker & Hale

[57] ABSTRACT

A veneer lathe for peeling a log has a knife carriage and a mechanism for moving the carriage towards and away from the log. There is an electric motor for moving the carriage towards the log at a rate of speed related to the rotational speed of the log so as to peel a required thickness of veneer and a clutch for coupling the electric motor to the mechanism or disengaging the electric motor from the mechanism. A hydraulic motor is connected to the mechanism for rapidly advancing the carriage towards the log or retracting the carriage from the log. A by-pass valve permits free rotation of the hydraulic motor when the clutch is engaged.

11 Claims, 3 Drawing Figures

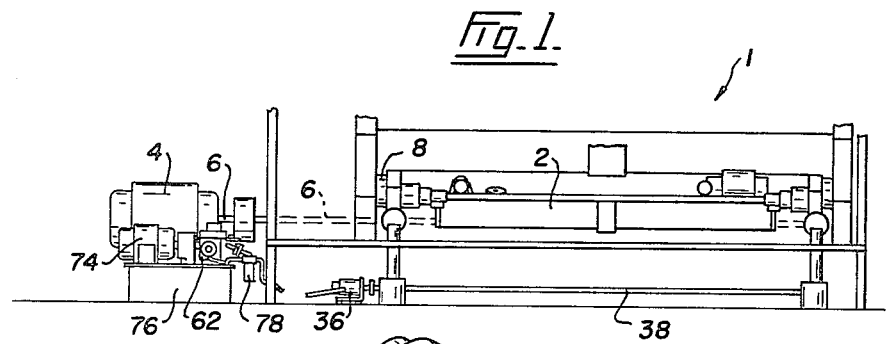
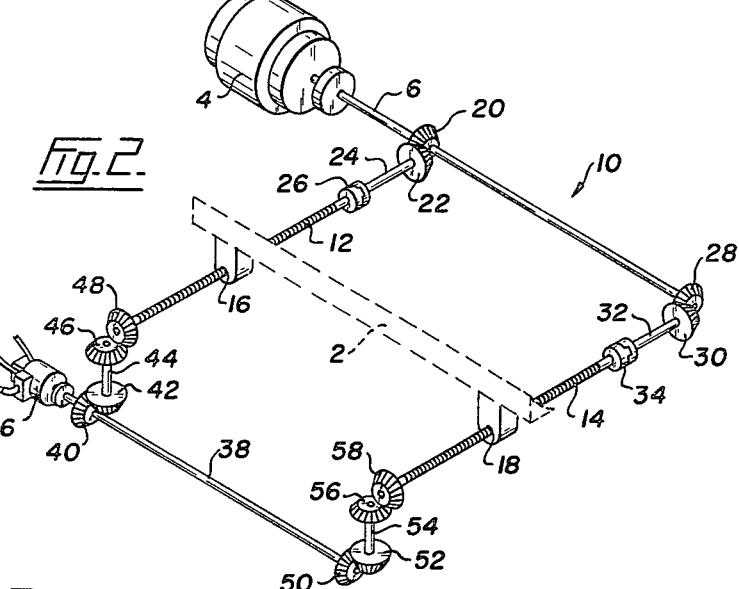
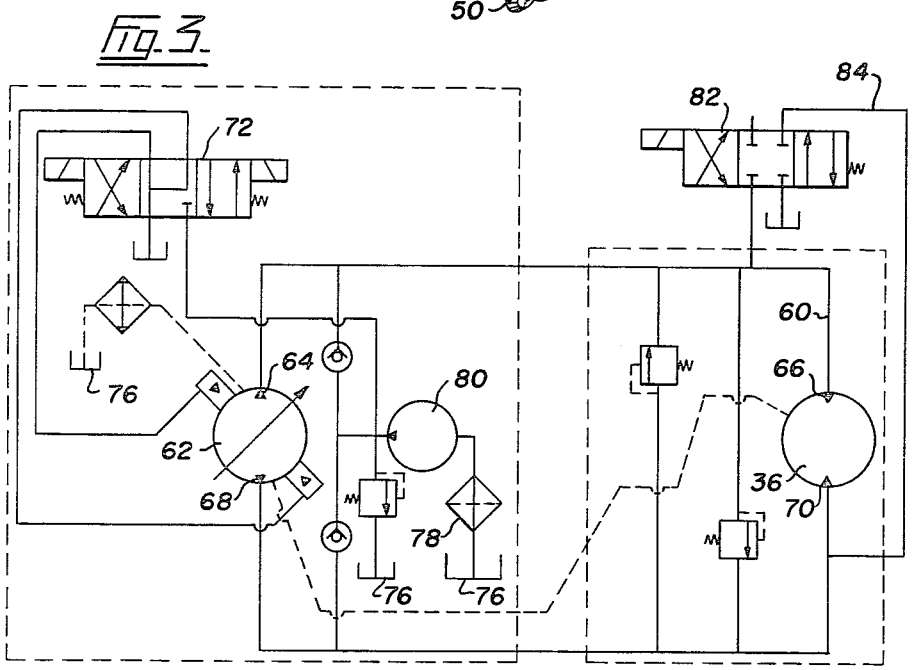

HYDROSTATIC DRIVE FOR LATHES

BACKGROUND OF THE INVENTION

Veneer lathes for peeling plywood veneer from a rotating log are well known. They include a pair of opposing rotatable chucks for rotating the log and a long blade held by a knife carriage for peeling the veneer from the log as it rotates. The log is rotated by a mechanism driven by an electric motor and, while the log is being peeled, the carriage is advanced slowly towards the log to peel a layer of required thickness. The mechanism for advancing the carriage towards the log while the log is being peeled is usually a mechanical mechanism coupled to the electric motor rotating the log. For example, some veneer lathes have a pair of spaced-apart threaded shafts extending away from the log through correspondingly tapped apertures in the knife carriage. The threaded shafts are rotated by a gear train connected to the electric motor to move the carriage towards the log. Of course, as the veneer is peeled from the log, the carriage moves closer to the centre of the log. Logs can be peeled effectively to a minimum core diameter of, for example, 5¼". This core must then be released from the chucks and a new log positioned. In order to position the new log, it is necessary to back the knife carriage away from the log. After the new log is properly positioned, the veneer carriage must be advanced towards the log until the knife contacts the log. The backing of the knife carriage away from the core and the advancing of the carriage towards the new log is preferably accomplished at a faster rate than the normal speed of advancement of the carriage while the log is being peeled. In the past, this rapid movement of the knife carriage was accomplished by driving the knife carriage with an electric motor. Approximately six to eight seconds were required to position a new log.

In the prior art, U.S. Pat. No. 2,027,295 to Stoddard employs a fluid cylinder for moving the knife.

U.S. Pat. No. 2,340,532 to Jackson employs a hydraulic cylinder for controlling the movement of the knife.

U.S. Pat. No. 3,244,206 to Bossen pertains to a device for monitoring moisture content to produce a uniform sheet of veneer.

U.S. Pat. No. 3,680,613 to Daniels shows a variable thickness control for a veneer lathe.

SUMMARY OF THE INVENTION

According to this invention, a veneer lathe for peeling a log comprises a knife carriage and a mechanism for moving the carriage towards and away from the log. An electric motor moves the carriage towards the log at a rate of speed related to the rotational speed of the log so as to peel a required thickness of veneer. A clutch couples the electric motor to the mechanism or disengages the electric motor from the mechanism. A hydraulic motor is connected to the mechanism for rapidly advancing the carriage towards the log or retracting the carriage from the log. A by-pass valve permits free rotation of the hydraulic motor when the clutch is engaged.

When compared with the prior art, the present invention discloses an efficient device for the rapid advancement and retraction of the knife carriage of a veneer lathe. By employing the present invention, the time for positioning a new log in the chucks of the lathe can be reduced to three to four seconds from the previous six to eight seconds.

In drawings which illustrate embodiments of the invention:

FIG. 1 is a front elevational view of a veneer lathe according to an embodiment of the invention;

FIG. 2 is a schematic diagram of the mechanism for moving the carriage towards and away from the log; and FIG. 3 is a schematic diagram of the hydraulic system for rapidly advancing or retracting the carriage.

DESCRIPTION OF THE PREFERRED EMBODIMENTS

The veneer lathe 1, shown in FIG. 1, is generally similar to veneer lathes previously known and, therefore, will only be described in relation to the improved mechanism for rapidly advancing or retracting the knife carriage 2. The lathe 1 includes an electric motor 4 with a drive shaft 6 which drives the known mechanism for rotating the log 8. There is also a mechanism 10, shown schematically in FIG. 2, for moving the carriage 2 towards and away from the log 8. The mechanism 10 comprises a pair of parallel, spaced-apart threaded shafts 12 and 14 which extend away from the log 8 in a horizontal plane. The shafts 12 and 14 are respectively received in correspondingly tapped apertures 16 and 18 of the knife carriage 2. Consequently, as the shafts 12 and 14 are rotated in one direction, the knife carriage 2 is advanced towards the log 8 and, as the shafts 12 and 14 are rotated in the opposite direction, the carriage 2 is moved away from the log 8.

During the peeling of the log, the mechanism 10 is normally driven by electric motor 4 which is connected to shaft 12 by mating bevel gears 20 and 22, shaft 24, which is colinear with shaft 12, and a clutch 26. A similar pair of mating bevel gears 28 and 30, shaft 32 and clutch 34 drive the threaded shaft 14. The gear ratio between the two pairs of mating bevel gears and the pitch of the threads on the shafts 12 and 14 dictate of speed of the carriage 2 as it moves towards the log in relation to the rotational speed of the log. This determines the thickness of veneer which is peeled from the log.

As mentioned above, it is desirable to provide a faster and more efficient mechanism for advancing and retracting the knife carriage when the logs are being changed. According to the present invention, this is accomplished by a fixed piston hydraulic motor 36 coupled to a drive shaft 38. A suitable motor is an Eaton (T.M.), model MF 3930-000. Drive shaft 38 is geared to the threaded shaft 12 by means of a first pair of mating bevel gears 40 and 42, a short shaft 44 and a second pair of mating bevel gears 46 and 48. The drive shaft 38 is coupled to threaded shaft 14 by means of the first pair of mating bevel gears 50 and 52, short shaft 54 and second pair of mating bevel gears 56 and 58. Of course, when the hydraulic motor 36 is used for the rapid advancement or retraction of the carriage 2, the electric motor 4 must be uncoupled from the mechanism 10. This is accomplished by disengaging the clutches 26 and 34. Preferably, clutches 26 and 34 are electrically controlled.

FIG. 3 illustrates schematically the hydraulic system used with hydraulic motor 36. Pressurized hydraulic fluid for operating the motor is supplied through a closed-loop conduit 60 which connects the motor 36 to a variable displacement piston pump 62. Pump 62 is an Eaton (T.M.) PV 5420-004 hydraulic pump in one embodiment of the invention. To rotate the motor 36 in one direction and advance the carriage 2 towards the log 8, fluid is pumped from port 64 of pump 62 towards port 66 of the motor 36. To rotate the motor 36 in the opposite direction and retract the carriage 2 away from the log 8, fluid is pumped from port 68 of pump 62 towards port 70 of the motor 36. The reversal of fluid flow, the rate of flow, and, consequently, the speed at which carriage 2 moves, is controlled by an electro-servo control valve 72. A Moog (T.M.) servo valve, model 62-502, is used in one embodiment of the invention. The hydraulic pump 62 runs continuously and is driven by an electric motor 74. The hydraulic motor 36 is operated in either direction or stopped by controlling the output of the pump 62. A DC electric current is sent from controls operated by the lathe operator to the servo control valve 72 for this purpose. As seen in FIG. 3, other components of the hydraulic system in association with pump 62 include a hydraulic fluid reservoir 76, a ten micron filter 78, and a charge pump 80.

Just as the electric motor 4 must be disconnected from the knife carriage 2 when the hydraulic motor 36 is operating for the rapid advancement or retraction of the carriage 2, provision must be made for motor 36 when the log is being peeled. Although servo control valve 72 can be used to stop the flow of hydraulic fluid from pump 62 to motor 36, it is also necessary to provide for the free rotation of motor 36 when the log is being peeled. For this purpose, a solenoid operated by-pass valve 82 is connected to each side of the motor 36 by means of the by-pass conduit 84. By means of suitable electrical controls not comprising part of the invention, the lathe operator can simultaneously open by-pass valve 82, and provide for free rotation of hydraulic motor 36, when clutches 26 and 34 are engaged. Correspondingly, by-pass valve 82 is shut when clutches 26 and 34 are disengaged. Valve 82 can be, for example, a modified Rexroth (T.M.) 4-way, 3-position valve with one solenoid removed and the spool spring returned, making it a 2-position valve. Ports "P" and "A" are used and port "T" drained to reservoir 76.

A cycle of operation begins when a new log is inserted in the lathe chucks. With clutches 26 and 34 disengaged, the operator actuates a control to advance the carriage. This sends an electric signal to the servo control valve 72, causing the pump 62 to pump fluid from port 64 on the pump to port 66 on the motor which rotates motor 36 in a direction to rotate threaded shafts 12 and 14 for the advancement of the carriage 2 towards the log 8. During this time, by-pass valve 82 remains closed.

When the peeling knife engages the log, the operator engages a "peel" control which sends a signal to the servo control valve 72, returning it to the neutral position and causing the pump 62 to stop pumping oil towards the motor 36. At precisely the same instant, a signal is sent to the by-pass valve 82 which opens the valve, allowing hydraulic fluid to freely pass from port 66 to port 70 of the motor 36 through the by-pass conduit 84. This enables the motor to be free-wheeled. Again at the same instant, the clutches 26 and 34 are engaged, causing the carriage 2 to be advanced towards the log 8 at a predetermined speed to peel the log.

When the log is peeled down to the predetermined "core" size, for example 5¼", a limit switch is activated which sends an electric signal to the servo control valve 72, giving a full flow of oil from port 68 of the pump 62 to port 70 of the motor 36. At the same instant a signal is sent to the by-pass valve 82, causing it to close and block the by-pass conduit 84. Again at the same instant, clutches 26 and 34 are disengaged. Motor 36 is supplied by fluid through port 70 to rotate it in a direction to move carriage 2 rapidly away from the log 8.

The dead time encountered during the changing of the log is reduced by approximately 50% through the use of the invention to rapidly advance and retract the carriage 2. In either direction of rotation, the motor 36 reaches full speed in approximately 0.4 seconds. The system provides greater production, less maintenance and infinite speed control in both directions.

What I claim is:

1. A veneer lathe for peeling a log, comprising: a knife carriage; a mechanism for moving the carriage towards and away from the log; an electric motor for moving the carriage towards the log at a rate of speed related to the rotational speed of the log so as to peel a required thickness of veneer; a clutch for coupling the electric motor to the mechanism or disengaging the electric motor from the mechanism; a hydraulic motor connected to the mechanism for rapidly advancing the carriage towards the log or retracting the carriage from the log; and a by-pass valve which permits free rotation of the hydraulic motor when the clutch is engaged.

2. A veneer lathe as claimed in claim 1, the by-pass valve being on an oil conduit connecting two ports of the hydraulic motor.

3. A veneer lathe as claimed in claim 2, the hydraulic motor being a fixed piston motor.

4. A veneer lathe as claimed in claim 3, a comprising a hydraulic pump for supplying pressurized hydraulic fluid to the hydraulic motor.

5. A veneer lathe as claimed in claim 4, the hydraulic pump being a variable piston pump.

6. A veneer lathe as claimed in claim 5, comprising a servo control valve for controlling the output volume of hydraulic fluid from the hydraulic pump and for controlling the direction of flow to the hydraulic motor.

7. A veneer lathe as claimed in claim 6, the hydraulic motor and the hydraulic pump being connected along a closed-loop hydraulic conduit.

8. A veneer lathe as claimed in claim 7, the mechanism for moving the carriage comprising a rotatable threaded shaft extending away from the log, the shaft extending through a correspondingly tapped aperture in the carriage.

9. A veneer lathe as claimed in claim 8, the electric motor being connected to one end of the shaft and the hydraulic motor being connected to another end of the shaft, the clutch being connected between the shaft and the electric motor.

10. A veneer lathe as claimed in claim 9, the hydraulic motor and the electric motor being connected to the shaft by mating bevel gears.

11. A veneer lathe as claimed in claim 10, comprising two spaced-apart said shafts to each side of the carriage.

* * * * *